V. E. FUNKHOUSER AND A. M. MEYERS.
MOTOR VEHICLE TURNER.
APPLICATION FILED MAY 19, 1920.
1,394,489.
Patented Oct. 18, 1921.
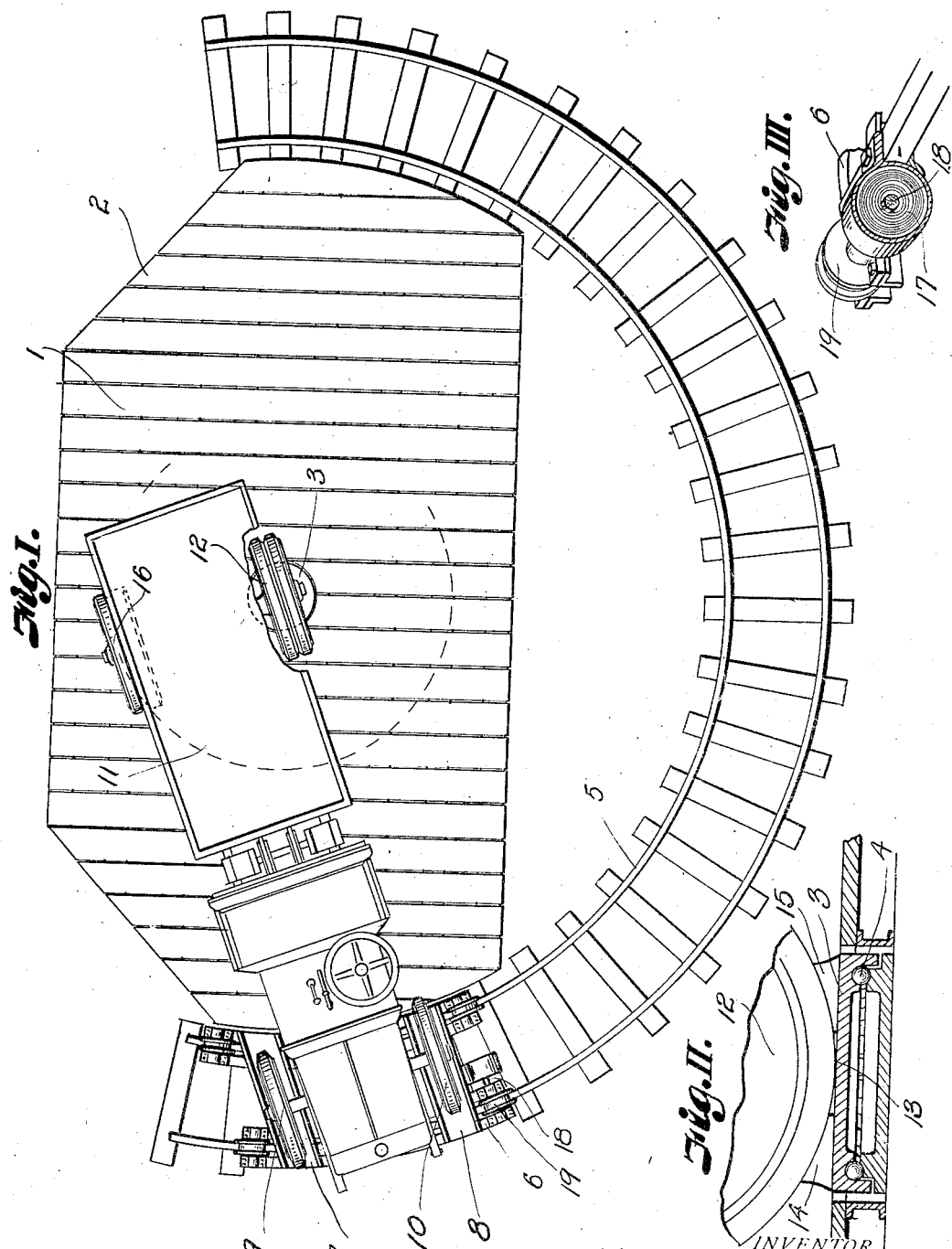
INVENTOR
Vernon E. Funkhouser.
Alfred M. Meyers
BY Arthur C. Brown
ATTORNEY

UNITED STATES PATENT OFFICE.

VERNON E. FUNKHOUSER, OF KANSAS CITY, MISSOURI, AND ALFRED M. MEYERS, OF MERRIAM, KANSAS.

MOTOR-VEHICLE TURNER.

1,394,489.　　　Specification of Letters Patent.　　Patented Oct. 18, 1921.

Application filed May 19, 1920. Serial No. 382,518.

*To all whom it may concern:*

Be it known that we, VERNON E. FUNKHOUSER and ALFRED M. MEYERS, citizens of the United States, residing at Kansas City, Jackson county, Missouri, and Merriam, in the county of Johnson and State of Kansas, respectively, have invented certain new and useful Improvements in Motor-Vehicle Turners; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a motor vehicle turner particularly applicable for use in roadways as a temporary means for permitting motor vehicles to turn within a relatively narrow compass.

As an example of the use to which the invention may be put, reference may be had to road building. In building roads it is usually necessary to carry the road surface material from a point distant to the road surfacing machines and when the truck reaches its destination it must turn so that it may back into proximity to the receiving end of the road surfacing machine or mixer in order to save expense and labor of handling the material. The trucks for carrying this material have relatively long wheel bases and the widths of the roadways are not conducive to easy turning of the trucks.

With a device constructed in accordance with our invention, the truck can move in the direction of the machine which is to receive its contents and pass upon a portable platform so designed that the truck may make a complete turn within a radius not exceeding its length; thus obviating many difficulties heretofore encountered in the laying-down of a road surface.

As the building of the road progresses, the device may be moved along, always in front of the machine into which the contents of the truck is dumped; therefore, means will always be at hand to permit the short turning of the truck even on narrow roadways.

In the drawings,

Figure I is a plan view of a device constructed in accordance with our invention, showing the truck thereon.

Fig. II is a cross sectional view through the rotatable rear wheel support in the center of the device, and Fig. III is a sectional view through the carriage.

Referring now to the drawings by numerals of reference:

1 designates a platform having an edge 2 over which the truck may be driven onto the platform 1. The center of the platform 1 is provided with a rotatable rear wheel support or table 3, preferably mounted upon a ball race 4. About the perimeter of the platform 1 is an arcuate or segmental track or guideway 5 to receive a carriage 6 having channel wheel supports 7 and 8 to receive the front wheels 9 and 10 of the truck 11. When the truck is driven onto the platform one of the rear wheels, for example, the wheel 12, will be moved over the platform so that it will rest upon the axis 13 of the rotatable wheel support 3. Then the wheel 12 will be chocked or blocked by the blocks 14 and 15 (see Fig. II) so that the wheel 12 may not rotate. If power is applied to the vehicle, the differential will cause the off rear wheel 16 only to rotate because it will offer the least resistance to the gears in the differential and it will have a tendency to scribe a circle as shown in dotted lines in Fig. I, with the wheel 12 and the wheel support 3 as a pivot for the truck. Therefore, the truck will be swung around in a contra-clockwise direction, causing the carriage 6 to rotate from left to right over the track or guide 5. The swinging motion will continue until the truck has reversed its position, whereupon the blocks may be removed and the truck may be driven off the edge 2 and backed up to the machine into which it is to dump its contents.

The carriage 6 is provided with a returnable motor consisting of a spring 17, one end of which is connected to the carriage frame and the other to the axle 18 on which is rigidly mounted the wheel 19. The particular construction of the motor is immaterial as the above description will be ample to enable any one to construct it and apply it to the carriage.

Examples of spring wound motors are well known and any form of motor which will wind up when the axle 18 is rotating in one direction and unwind when the weight of the vehicle is taken off the carriage so that the carriage may return to its original position will be suitable for the purpose herein. The crank, however, might with advantage be applied to the outer end of the axle 18 so that the spring for the motor may be initially wound manually so as to provide reserve energy in the motor to take care of slippage as the carriage 6 moves over its guide 5.

When the parts are as shown in Fig. I and the truck is swung so that the carriage will move over the track to reverse the truck, the forward rotation of the front axle of the truck will wind up the spring 17. When the truck is moved off the carriage, the weight thereof will be relieved from the carriage and the spring may unwind, causing the front wheel on the axle 18 to rotate in a reverse direction to move back to the position shown in Fig. I.

A suitable bumper may be provided to limit the return movement of the carriage, if desired.

What we claim and desire to secure by Letters-Patent is:

1. In a turn table for vehicles, a platform, a rotatable wheel support carried by the platform, blocks for chocking the rear wheel of the motor vehicle to the wheel support, an arcuate track concentric with the wheel support, and a carriage for supporting the front wheels of the vehicle movable over the track.

2. In a turn table for vehicles, a platform, a rotatable wheel support carried by the patform, blocks for chocking the rear wheel of the motor vehicle to the wheel support, an arcuate track concentric with the wheel support, a carriage for supporting the front wheels of the vehicle movable over the track, and means on the carriage for storing energy as the carriage moves over the track in one direction whereby when the vehicle moves off the carriage, said carriage will return to its original position.

3. In a turn table for vehicles, a platform, a rotatable member carried by the platform to receive one of the rear wheels of the vehicle, leaving the other wheel free to rotate on the platform, and a movable means for supporting the front end of the vehicle whereby when power is applied to the vehicle the free wheel will scribe an arc on the platform and swing the front end of the vehicle about the vehicle axis of the single rear wheel support carried by the platform.

4. A turntable for motor vehicles having a rear differential, comprising a rigid vehicle-supporting platform, a pivot on the rigid platform for one rear wheel, an arcuate guideway about the platform, a front wheel-supporting carriage movable on the guideway, and wheel-receiving channels on the carriage extending transversely thereof.

5. A turntable for motor vehicles having a rear differential, comprising a rigid vehicle-supporting platform, a pivot on the rigid platform for one rear wheel of the vehicle, an arcuate guideway about the platform, and a front wheel supporting carriage movable on the guideway, the rear wheel of the vehicle free from the pivot being movable over the rigid platform to impart motion to the carriage whereby the motor vehicle can be turned about the pivot on the rigid platform.

6. A turntable for four wheeled motor vehicles having a differential, comprising means for supporting three wheels of the motor vehicle, the fourth wheel furnishing the power through the differential for turning the supporting means.

7. A turntable for motor vehicles having a rear differential, comprising a carriage for supporting the front wheels of a vehicle, and means for supporting one rear wheel of the vehicle, the other rear wheel of the vehicle having traction for driving the carriage through the motor vehicle whereby the motor vehicle will be turned about the supported rear wheel.

In testimony whereof we affix our signatures.

VERNON E. FUNKHOUSER.
ALFRED M. MEYERS.